United States Patent
Lee et al.

(10) Patent No.: US 9,433,025 B2
(45) Date of Patent: Aug. 30, 2016

(54) D2D COMMUNICATION METHOD ACCORDING TO D2D SERVICE TYPE AS WELL AS D2D APPLICATION TYPE, AND APPARATUS FOR SAME

(71) Applicant: LG ELECTRONICS INC., Seoul (KR)

(72) Inventors: Eunjong Lee, Anyang-si (KR); Seunghyun Kang, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/377,751

(22) PCT Filed: Feb. 12, 2013

(86) PCT No.: PCT/KR2013/001074
§ 371 (c)(1),
(2) Date: Aug. 8, 2014

(87) PCT Pub. No.: WO2013/119094
PCT Pub. Date: Aug. 15, 2013

(65) Prior Publication Data
US 2016/0014831 A1    Jan. 14, 2016

Related U.S. Application Data

(60) Provisional application No. 61/597,183, filed on Feb. 10, 2012, provisional application No. 61/602,027, filed on Feb. 22, 2012.

(51) Int. Cl.
*H04W 76/02* (2009.01)
*H04W 8/00* (2009.01)
(Continued)

(52) U.S. Cl.
CPC ........... *H04W 76/023* (2013.01); *H04W 8/005* (2013.01); *H04L 67/16* (2013.01); *H04W 28/18* (2013.01); *H04W 92/18* (2013.01)

(58) Field of Classification Search
CPC .................................................. H04W 76/023
USPC ................ 370/248, 254, 329, 328, 331, 412
See application file for complete search history.

(56) References Cited

U.S. PATENT DOCUMENTS

2004/0088347 A1* 5/2004 Yeager .................. H04L 67/104
709/202
2004/0106408 A1* 6/2004 Beasley ............ H04W 36/0083
455/436

(Continued)

FOREIGN PATENT DOCUMENTS

JP    2010-034689    2/2010
JP    2010-200052    9/2010

(Continued)

OTHER PUBLICATIONS

PCT International Application No. PCT/KR2013/001074, Written Opinion of the International Searching Authority dated Jun. 13, 2013, 1 page.

(Continued)

*Primary Examiner* — Andrew Lai
*Assistant Examiner* — Andrew C Lee
(74) *Attorney, Agent, or Firm* — Lee Hong Degerman Kang & Waimey; Jonathan Kang; Jeffrey Lotspeich

(57) ABSTRACT

A device-to-device (D2D) terminal for communicating in a wireless communication system supporting D2D communication includes: a receiver configured to receive information for setting the D2D searching interval corresponding to a D2D service type or D2D application type from a base station; and a processor configured to search an neighbor D2D terminal in a D2D searching interval corresponding to a D2D service type or a first D2D application type to be executed on the basis of the information for setting the D2D searching interval, to select any one D2D terminal from among the one or more searched neighbor D2D terminals in order to set a connection corresponding to the first D2D service type or the first D2D application type, and to control the D2D communication corresponding to the first D2D service type or the first D2D application type with the selected D2D terminal according to the connection.

6 Claims, 10 Drawing Sheets

(51) Int. Cl.
*H04W 28/18* (2009.01)
*H04W 92/18* (2009.01)
*H04L 29/08* (2006.01)

(56) References Cited

U.S. PATENT DOCUMENTS

| | | | | |
|---|---|---|---|---|
| 2004/0172467 | A1* | 9/2004 | Wechter | H04L 41/12 709/224 |
| 2004/0267876 | A1* | 12/2004 | Kakivaya | H04L 67/16 709/200 |
| 2007/0171910 | A1* | 7/2007 | Kumar | H04L 63/0428 370/392 |
| 2007/0250649 | A1* | 10/2007 | Hickey | G06F 13/385 710/62 |
| 2008/0025535 | A1* | 1/2008 | Rajapakse | H04L 65/605 381/311 |
| 2008/0123551 | A1* | 5/2008 | Hanes | H04L 29/12028 370/254 |
| 2009/0010232 | A1* | 1/2009 | Laroia | H04W 56/002 370/338 |
| 2009/0325601 | A1* | 12/2009 | Park | H04W 8/005 455/456.2 |
| 2010/0302056 | A1* | 12/2010 | Dutton | H04W 4/02 340/8.1 |
| 2010/0315972 | A1* | 12/2010 | Plotnik | H04L 67/125 370/254 |
| 2011/0153789 | A1* | 6/2011 | Vandwalle | H04W 8/005 709/221 |
| 2012/0079296 | A1* | 3/2012 | Ise | G06F 1/325 713/310 |
| 2012/0184301 | A1* | 7/2012 | Jovicic | G01S 5/0081 455/456.5 |
| 2013/0109301 | A1* | 5/2013 | Hakola | H04W 76/023 455/39 |
| 2013/0122893 | A1* | 5/2013 | Turtinen | H04W 8/005 455/423 |
| 2013/0159407 | A1* | 6/2013 | Koskela | H04L 67/1063 709/204 |
| 2013/0182584 | A1* | 7/2013 | Maguluri | H04W 76/023 370/252 |
| 2013/0188546 | A1* | 7/2013 | Turtinen | H04W 8/005 370/312 |

FOREIGN PATENT DOCUMENTS

| | | |
|---|---|---|
| KR | 10-2011-0036087 | 4/2011 |
| KR | 10-2011-0138361 | 12/2011 |

OTHER PUBLICATIONS

Abraham, et al., "Efficient Device and Service Discovery for Peer-to-Peer (P2P) scenarios," doc.:IEEE 802.11-11/1517r0, Oct. 2011, 17 pages.

* cited by examiner

D2D COMMUNICATION METHOD ACCORDING TO D2D SERVICE TYPE AS WELL AS D2D APPLICATION TYPE, AND APPARATUS FOR SAME

CROSS-REFERENCE TO RELATED APPLICATIONS

This application is the National Stage filing under 35 U.S.C. 371 of International Application No. PCT/KR2013/001074, filed on Feb. 12, 2013, which claims the benefit of U.S. Provisional Application Serial Nos. 61/597,183, filed on Feb. 10, 2012, and 61/602,027, filed on Feb. 22, 2012, the contents of which are all hereby incorporated by reference herein in their entirety.

TECHNICAL FIELD

The present invention relates to a wireless communication, and more particularly, to a method of performing a D2D communication in accordance with a D2D service type or a D2D application type and apparatus therefor.

BACKGROUND ART

Recently, as smartphones and tablet PCs are widely used and multimedia communications of high capacity are activated, mobile traffic increases rapidly. The increasing tendency of the mobile traffic in the future is expected to increase about twice each year. Since most of the mobile traffic is transmitted through a base station, communication service providers are currently confronted with serious network overloads. In order to handle the increasing traffic, the communication service providers increase network equipment investment and commercialize the next generation mobile communication standards (e.g., WiMAX, LTE (long term evolution), etc.) for efficiently handling lots of traffic in a hurry. Yet, in order to bear the amount of traffic expected to increase further rapidly, it is time to seek for other solutions.

D2D (device-to device) communication is a distributive communication technology for directly delivering traffic between neighbor nodes without using such an infrastructure as a base station. In D2D communication environment, each node such as a mobile terminal and the like searches for another user equipment physically adjacent to the corresponding node by itself, establishes a communication session, and then transmits traffic. Thus, since the D2D communication can solve the traffic overload problem in a manner of distributing the traffic focused on a base station, the D2D communication is spotlighted as an elementary technology of the post 4G next generation mobile communication. Such a standardization organization as 3GPP, IEEE and the like is promoting D2D communication standard enactment based on LTE-A or Wi-Fi. And, such a company as Qualcomm and the like is developing an independent D2D communication technology.

A D2D user equipment may have at least one D2D service/application type to implement. In case of attempting to perform a D2D communication with another D2D user equipment in accordance with a specific D2D service type or a specific D2D application type at a specific timing point, if an existing D2D communication method is used as it is, it may cause a considerable problem in aspect of a power consumption. However, solutions for this problem have not been proposed yet.

DISCLOSURE OF THE INVENTION

Technical Tasks

One object of the present invention is to provide a method for a D2D user equipment to perform a D2D communication in a wireless communication system supportive of a device-to-device (D2D) communication.

Another object of the present invention is to provide a D2D user equipment capable of performing a communication in a wireless communication system supportive of a device-to-device (D2D) communication.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a communication, which is performed by a D2D user equipment in a wireless communication system supportive of a D2D (device-to-device) communication, according to the present invention may include the steps of receiving a D2D discovery interval configuration information corresponding to a D2D service type or a D2D application type each from a base station, searching for neighbor D2D user equipments in a D2D discovery interval corresponding to a first D2D service type or a first D2D application type to enable based on the D2D discovery interval configuration information, establishing a connection corresponding to the first D2D service type or the first D2D application type by selecting a prescribed D2D user equipment from the found at least one or more neighbor D2D user equipments, and performing the D2D communication corresponding to the first D2D service type or the first D2D application type with the selected D2D user equipment in accordance with the connection. A period or length of the D2D discovery interval may be different per the D2D service type or the D2D application type. The D2D discovery interval may include a discovery region corresponding to a plurality of D2D service types or a plurality of D2D application type and a D2D discovery region corresponding to the first D2D service type or the first D2D application type in the D2D discovery interval may be searched. The D2D discovery interval corresponding to the first D2D service type or the first D2D application type may be located across at least two D2D discovery intervals.

The method further includes the step of establishing a connection corresponding to a second D2D service type or a second D2D application type with the selected D2D user equipment. When the connection corresponding to the second D2D service type or the second D2D application type with the selected D2D user equipment is configured, a discovery of the D2D discovery interval may be skipped.

The method further includes the step of establishing a connection corresponding to a second D2D service type or a second D2D application type with the selected D2D user equipment, and an identifier in accordance with the connection established for the second D2D service type or the second D2D application type may be set to be identifiable from an identifier in accordance with the connection established for the first D2D service type or the first D2D application type.

The method may further include the step of transmitting a D2D discovery signal in the D2D discovery interval corresponding to the D2D service type or the D2D application type supported by the D2D user equipment.

To further achieve these and other advantages and in accordance with the purpose of the present invention, as embodied and broadly described, in performing a communication in a wireless communication system supportive of a D2D (device-to-device) communication, a D2D user equipment according to the present invention may include a receiver configured to receive a D2D discovery interval configuration information corresponding to a D2D service type or a D2D application type each from a base station, a processor configured to search for neighbor D2D user equipments in a D2D discovery interval corresponding to a first D2D service type or a first D2D application type to enable based on the D2D discovery interval configuration information, the processor configured to establish a connection corresponding to the first D2D service type or the first D2D application type by selecting a prescribed D2D user equipment from the found at least one or more neighbor D2D user equipments, the processor configured to control the D2D communication corresponding to the first D2D service type or the first D2D application type to be performed with the selected D2D user equipment in accordance with the connection.

The processor may be configured to establish a connection corresponding to a second D2D service type or a second D2D application type with the selected D2D user equipment. When the connection corresponding to the second D2D service type or the second D2D application type with the selected D2D user equipment is configured, the processor may control a discovery of the D2D discovery interval to be skipped.

The processor may be configured to establish a connection corresponding to a second D2D service type or a second D2D application type with the selected D2D user equipment and an identifier in accordance with the connection established for the second D2D service type or the second D2D application type may be set by the processor to be identifiable from an identifier in accordance with the connection established for the first D2D service type or the first D2D application type.

Advantageous Effects

According to embodiments of the present invention, a discovery procedure performed for a D2D communication is performed in accordance with a D2D service type or a D2D application type, whereby power consumptions of D2D user equipments can be considerably reduced.

In case that a D2D initiation user equipment makes a request for a D2D communication connection establishment, it is able to minimize a power consumed by the corresponding user equipment for searching for neighbor D2D user equipment(s). Only a user equipment required for an application activated by a D2D user equipment can be selectively found and collected. And, information on the found and collected user equipment can be saved. In case that a D2D user equipment candidate waits for a D2D communication connection request, it is able to minimize a consumed power by decreasing a discovery slot for announcing its existence.

Effects obtainable from the present invention may be non-limited by the above mentioned effect. And, other unmentioned effects can be clearly understood from the following description by those having ordinary skill in the technical field to which the present invention pertains.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 (c) is a diagram for one example to describe a concept of an autonomous D2D communication type.

BEST MODE FOR INVENTION

Figure 1:
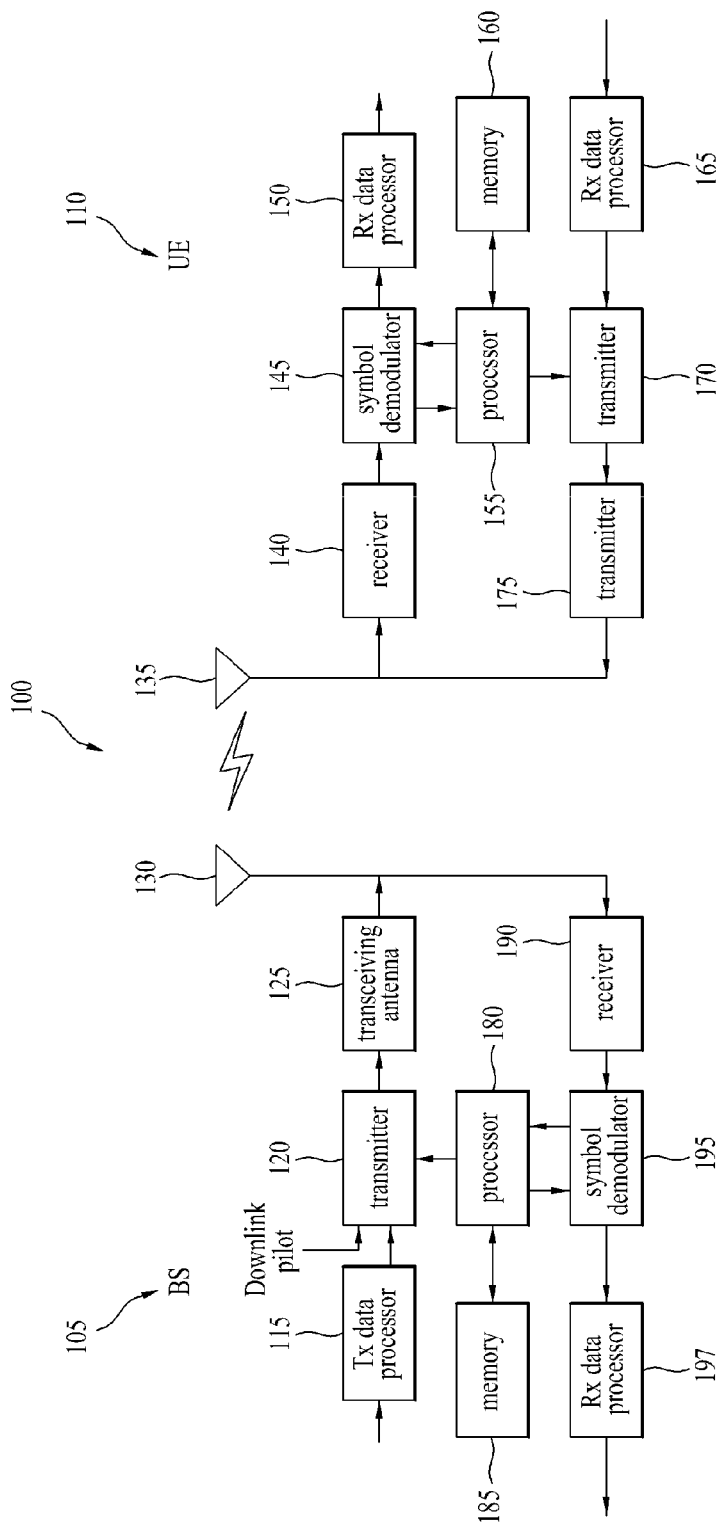
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In the following description, various embodiments for a user equipment to perform a device-to-device communication (hereinafter named a D2D communication or a D2D direct communication) are explained. In describing a D2D communication, 3GPP LTE/LTE-A is taken as an example for the detailed description. Moreover, the D2D communication is applicable to other communication systems (e.g., IEEE 802.16, WiMAC, etc.).

In the present specification, for clarity of the description, a user equipment supportive of a D2D communication (i.e., a device-to-device direct communication) or a user equipment capable of performing the D2D communication shall be named a D2D user equipment. In case that a transmitting end and a receiving end need to be discriminated from each other, a D2D user equipment transmitting or attempting to transmit data to a different D2D user equipment using a radio resource given to a D2D link on performing a D2D communication shall be named a transmitting D2D user equipment. And, a user equipment receiving or attempting to receive the data from the transmitting D2D user equipment shall be named a receiving D2D user equipment. If a plurality of receiving D2D user equipments receiving or attempting to receive data from a transmitting D2D user equipment exist, a plurality of the receiving D2D user equipments can be identified from each other using ordinal numbers including '$1^{st}$ to $N^{th}$'. Moreover, for clarity of the following description, such a random node at a network end as a base station configured to control a connection between D2D user equipments or allocate a radio resource to a D2D link, a D2D server, a connection/session management server and the like shall be named 'network'.

Figure 2:
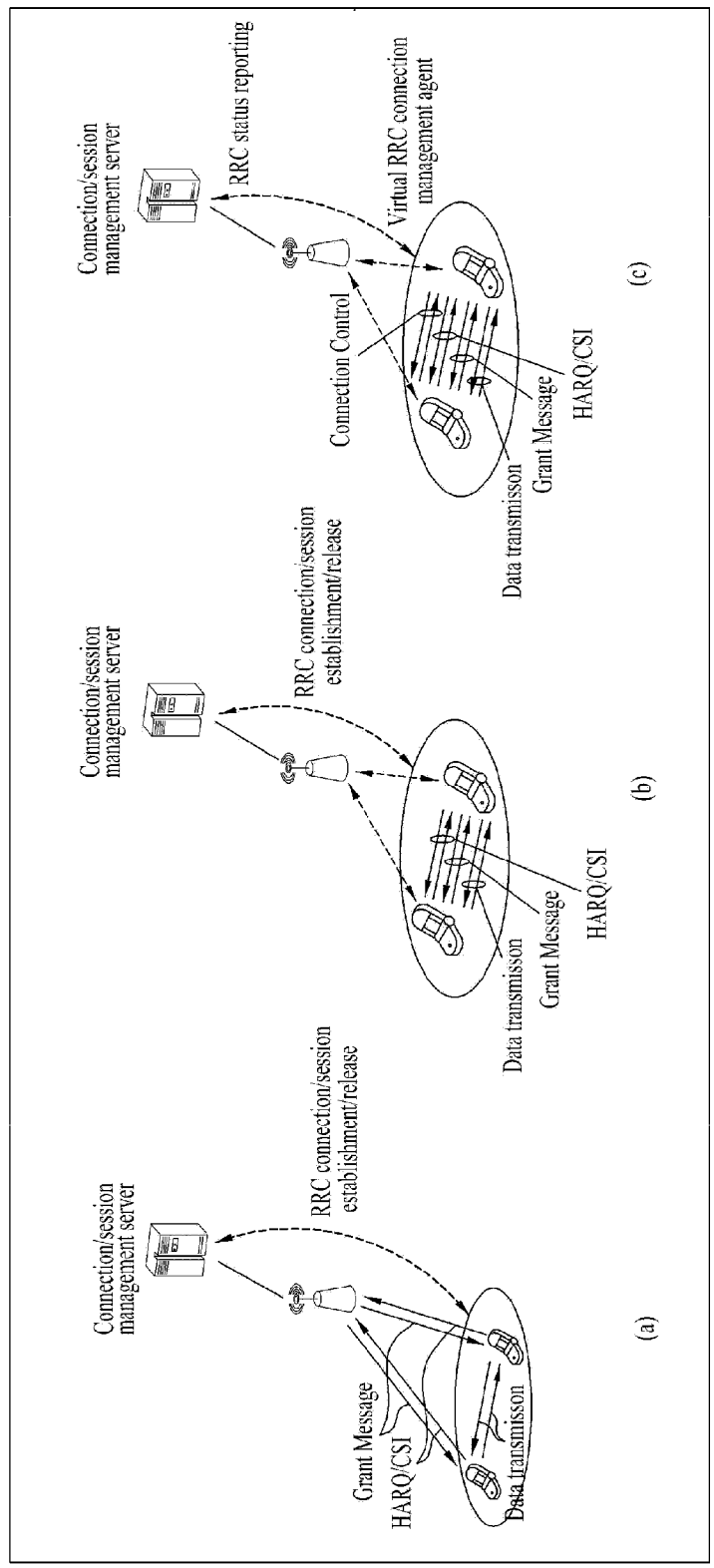
FIG. 2 (a) and FIG. 2 (b) are diagrams for examples to describe a network centralized D2D communication type and a distributive D2D communication type in accordance with a network coordinated D2D communication type, respectively.

FIG. 2 is a diagram for examples to describe various embodiments of a D2D communication.

D2D communication can be sorted into a network coordinated D2D communication type or an autonomous D2D communication type depending on a presence or non-presence of performing the D2D communication under the control of a network. The network coordinated D2D communication can be further sorted into a data-only-in-D2D type or a connection-control-only-in-network type depending on a level of network involvement. For clarity of the description, the data-only-in-D2D type shall be named 'network centralized D2D communication type' and the connection-control-only-in-network type shall be named 'distributive D2D communication type'.

FIG. 2 (*a*) and FIG. 2 (*b*) are diagrams for examples to describe a network centralized D2D communication type and a distributive D2D communication type in accordance with a network coordinated D2D communication type, respectively.

According to the network centralized D2D communication type shown in FIG. 2 (*a*), only data are exchanged between D2D user equipments, while a connection control between D2D user equipments and a radio resource allocation (grant message) are performed by a network. The D2D user equipments can transceive data or specific control information using a radio resource allocated by the network.

For instance, HARQ ACK/NACK feedback for a data reception between D2D user equipments or channel state information (CSI) can be transmitted to another D2D user equipment through a network instead of being directly exchanged between the D2D user equipments. In particular, if a network establishes a D2D link between D2D user equipments and allocates a radio resource to the established D2D link, a transmitting D2D user equipment and a receiving D2D user equipment are able to perform a D2D communication using the allocated radio resource.

Namely, according to the network centralized D2D communication type, a D2D communication between D2D user equipments is controlled by a network. And, the D2D user equipments are able to perform the D2D communication using a radio resource allocated by the network.

According to the distributive D2D communication type shown in FIG. 2 (*b*), a network performs a role more limited than that of a network according to the network centralized D2D communication type. According to the distributive D2D communication type, a network performs a control of connection between D2D user equipments. Yet, a radio resource allocation (grant message) between the D2D user equipments can be occupied by the D2D user equipments through contentions between the D2D user equipments without the help of the network.

For instance, HARQ ACK/NACK feedback for a data reception between D2D user equipments or channel state information can be directly exchanged between the D2D user equipments without passing through a network.

As mentioned in the foregoing description of the example, a D2D communication can be sorted into a network centralized D2D communication type or a distributive D2D communication type depending on a level of network D2D communication involvement. In this case, a common feature between the network centralized D2D communication type and the distributive D2D communication type lies in that a D2D connection control can be performed by a network.

In particular, according to a network coordinated D2D communication type, a network can establish a connection between D2D user equipments by establishing a D2D link between the D2D user equipments attempting to perform a D2D communication. In establishing the D2D link between the D2D user equipments, the network can give a physical D2D link identifier (LID) to the established D2D link. In this case, when a plurality of D2D links exist between a plurality of D2D user equipments, the physical D2D ink identifier can be used as an identifier for identifying each of the D2D links.

FIG. 2 (c) is a diagram for one example to describe a concept of an autonomous D2D communication type.

According to an autonomous D2D communication type, unlike a network centralized or distributive D2D communication type, D2D user equipments can freely perform a D2D communication without the help of a network. In particular, according to the autonomous D2D communication type, unlike the network centralized or distributive D2D communication type, a connection control, a radio resource occupation and the like can be autonomously performed by a D2D user equipment. If necessary, the network may provide the D2D user equipment with D2D channel information available for a corresponding cell.

Based on a frame structure mentioned in the following description, the autonomous D2D communication type shall be described in detail as follows.

Figure 3:
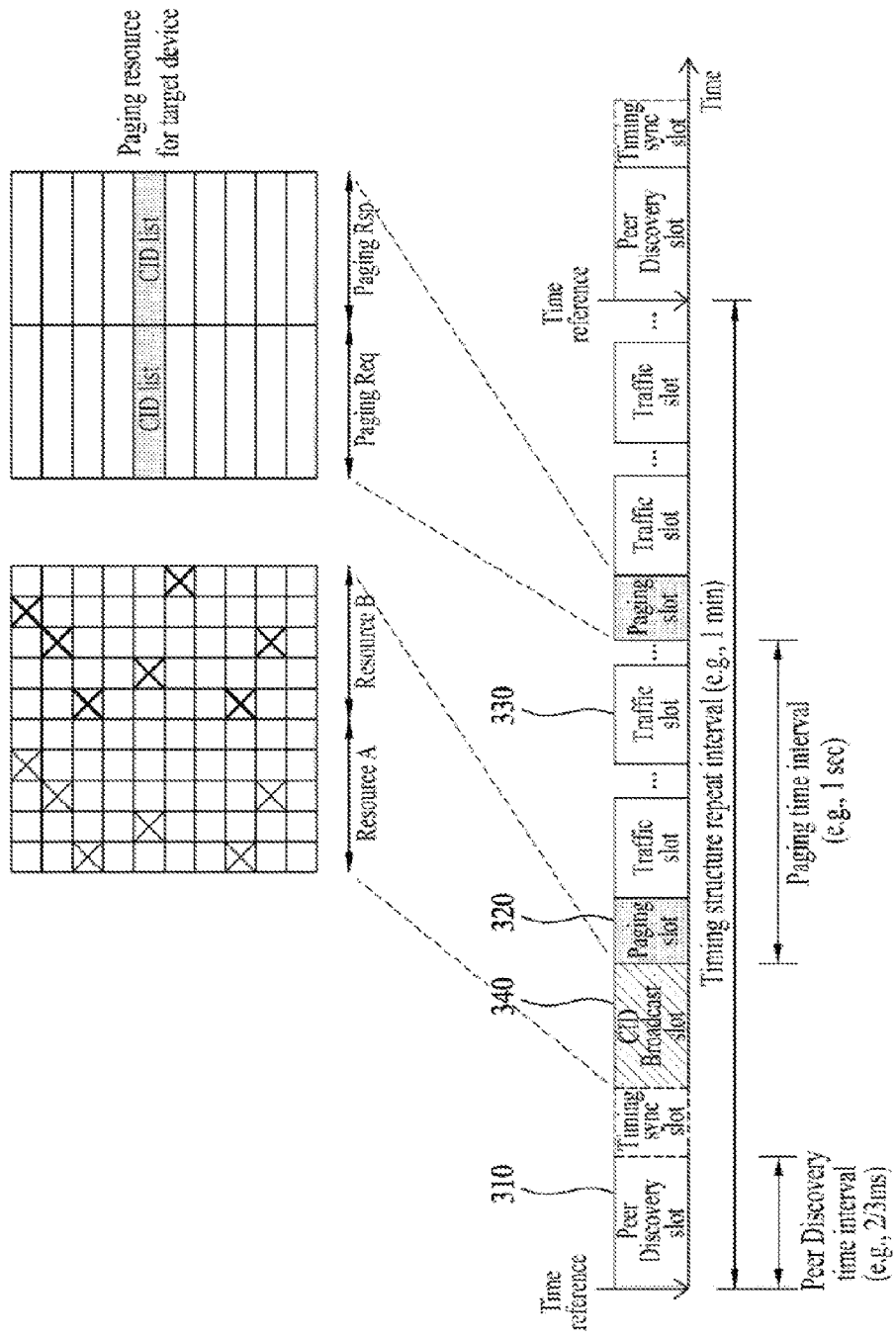
FIG. 3 is a diagram for one example of a frame structure applicable to an autonomous D2D communication type.

FIG. 3 is a diagram for one example of a frame structure applicable to an autonomous D2D communication type.

First of all, according to an autonomous D2D communication type, a D2D user equipment may be able to perform a D2D communication using a frame shown in FIG. 3 for example. Like the example shown in FIG. 3, a frame applicable to an autonomous D2D communication type may include a peer discovery slot 310, a paging slot 320 and a traffic slot 330. In some cases, the frame applicable to the autonomous D2D communication type may further include a CID (connection identification) broadcast slot 340.

The peer discovery slot 310 is provided to enable a D2D user equipment to detect a different D2D user equipment nearby and broadcast its presence to the different D2D user equipment nearby. A single peer discovery slot 310 includes a plurality of logical channels. The D2D user equipment can share the peer discovery slot 310 with a different D2D user equipment through broadcasting and listening. In particular, the D2D user equipment listens to a logical channel occupied by the different D2D user equipment from the different D2D user equipment nearby, thereby being able to recognize that a specific one of a plurality of the logical channels of the peer discovery slot 310 is currently used or that a specific one of a plurality of the logical channels is vacant.

In some cases, a broadcast listening available range of a D2D user equipment may be limited to a neighbor D2D user equipment within 1 hop centering on itself. Yet, the listening available range of the D2D user equipment needs not to be necessarily limited to the neighbor D2D user equipment within 1 hop.

Having listened to a logical channel occupied by a different D2D user equipment from a different D2D user equipment nearby, the D2D user equipment is able to randomly select one of vacant logical channels of the $1^{st}$ peer discovery slot 310. Subsequently, the D2D user equipment is able to broadcast a peer discovery signal for announcing the logical channel selected by the D2D user equipment on the selected logical channel through a next peer discovery slot. A process for the D2D user equipment to broadcast the peer discovery signal is described in detail with reference to FIG. 4 as follows.

Figure 4:
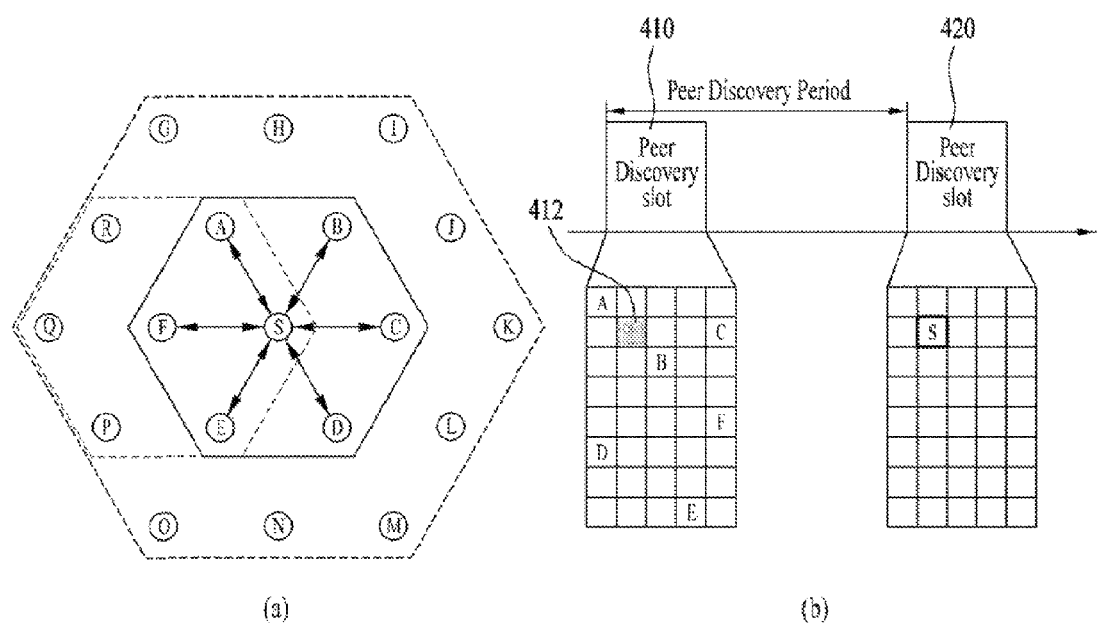
FIG. 4 is a diagram for one example to describe that a D2D user equipment broadcasts a peer discovery signal.

FIG. 4 is a diagram for one example to describe that a D2D user equipment broadcasts a peer discovery signal.

First of all, like the example shown in FIG. 4 (a), assume that D2D user equipments A to R exist around a D2D user equipment S. In this case, assume that the D2D user equipments A to F are neighbor user equipments located within 1 hop with reference to the D2D user equipment S. And, assume that the D2D user equipments G to R are neighbor user equipments located within 2 hops with reference to the D2D user equipment S.

In the environment shown in FIG. 4 (a), if a D2D user equipment is able to listen to a broadcast from a neighbor D2D user equipment within 1 hop, the D2D user equipment S may be able to listen to a logical channel occupied by the D2D user equipments A to F in a $1^{st}$ peer discovery slot 410. Having listened to the logical channel occupied by the D2D user equipments A to F, the D2D user equipment S can randomly select one of logical channels vacant in the peer discovery slot based on the listened broadcast [e.g., in FIG. 4 (b), a logical channel denoted by '412' is selected]. Thereafter, like the example shown in FIG. 4 (b), the D2D user equipment S can broadcast a peer discovery signal using the logical channel randomly selected from a $2^{nd}$ peer discovery slot 420.

Each of the D2D user equipments A to F listening to the logical channel selected by the D2D user equipment S is able to detect a presence or non-presence of collision of the logical channel selected by the D2D user equipment S. For instance, when the D2D user equipment F listens to the broadcasts from the D2D user equipments A, E and P to R, the D2D user equipment F is able to detect whether the logical channel selected by the D2D user equipment S collides with a logical channel of each of the D2D user equipments A, E and P to R. In case that the logical channel selected by the D2D user equipment S collides with the logical channel of the D2D user equipment Q, the D2D user equipment F transmits a notification signal notifying that the logical channel collision has been detected to the D2D user equipment S. Subsequently, the D2D user equipment S is then able to select a new logical channel in accordance with the notification signal.

On the other hand, the logical channel selected by the D2D user equipment S avoids the collision, the D2D user equipment S can keep broadcasting the peer discovery signal through the selected logical channel.

If the D2D user equipment F determines the collision with the logical channel occupied by the neighbor D2D user equipment Q, the D2D user equipment F transmits a notification signal notifying the detection of the collision to the D2D user equipment S so that the D2D user equipment S can select a new logical channel.

The CID broadcast slot 340 shown in FIG. 3 is provided to enable a D2D user equipment to listen to a CID currently used by a different D2D user equipment and to broadcast a CID currently used by itself. In particular, in order to announce a CID currently used by itself or a CID desired to be used by itself, the D2D user equipment is able to broadcast a CID broadcast signal through a CID resource of the CID broadcast slot 340. The D2D user equipment is able to set a CID to use through the paging slot 320 mentioned in the following description.

The paging slot 320 shown in FIG. 3 is provided to configure a CID between a transmitting D2D user equipment and a receiving D2D user equipment. The paging slot 320 for configuring the CI may include a paging request interval and a paging response interval. For the CID configuration between the transmitting D2D user equipment and the receiving D2D user equipment, one of the transmitting D2D user equipment and the receiving D2D user equipment operates as a paging initiator user equipment and the other can operate as a paging target user equipment.

The paging initiator user equipment is able to create a $1^{st}$ CID list containing at least one of vacant broadcast resources (i.e., unused CIDs) based on a CID listened to through the CID broadcast slot 340. Once the $1^{st}$ CID list is created, the paging initiator user equipment can transmit the $1^{st}$ CID list to the paging target user equipment using a paging resource of the paging initiator user equipment or a paging resource of the paging target user equipment.

In this case, the paging resource can be determined by a device identifier (Device ID) of the paging initiator user equipment or the paging target user equipment. A paging resource between D2D user equipments may be identifies by time-frequency or orthogonal code, by which the paging resource may be non-limited.

In the paging response interval, the paging target user equipment creates a $2^{nd}$ CID list containing at least one vacant broadcast resource based on a CID listened to through its own CID broadcast slot 340 and is then able to transmit the $2^{nd}$ CID list to the paging initiator user equipment using its own paging resource or a paging resource of the paging initiator user equipment.

Each of the paging initiator user equipment and the paging target user equipment selects an available CID candidate group based on the $1^{st}$ CID list and the $2^{nd}$ CID list, selects a prescribed CID from the available CID candidate group, and is then able to broadcast a CID broadcast signal through a CID resource of the CID broadcast slot 440 in order to announce the selected CID.

Thereafter, each of the paging initiator user equipment and the paging target user equipment is able to determine whether the selected CID is currently used by a different D2D user equipment through a next CID broadcast slot 340. In particular, each of the paging initiator user equipment and the paging target user equipment is able to determine whether the selected CID is currently used by comparing signal strengths for the same tone of different CID resources.

If it is determined that the selected CID is currently used, each of the paging initiator user equipment and the paging target user equipment is able to select a different CID. Otherwise, if it is determined that the selected CID is not currently used, each of the paging initiator user equipment and the paging target user equipment is able to activate the selected CID. Only if both of the paging initiator user equipment and the paging target user equipment activate the selected CID, the selected CID can be configured as a CID between the paging initiator user equipment and the paging target user equipment.

Unlike the network centralized D2D communication type or the distributive D2D communication type, a D2D user equipment in the autonomous D2D communication type autonomously performs a control of a connection to a different D2D user equipment. Hence, according to the autonomous D2D communication type, a D2D link ID cannot be assigned by a network. According to the autonomous D2D communication type, a D2D user equipment is able to perform a D2D communication by configuring a CID with a different D2D user equipment through the paging slot 320 instead of receiving assignment of a D2D link ID.

Once the CID configuration between the transmitting D2D user equipment and the receiving D2D user equipment is completed through the paging slot 320, the transmitting D2D user equipment and the receiving D2D user equipment can perform a data transceiving using the traffic slot 330. In doing so, the transmitting D2D user equipment and the receiving D2D user equipment can occupy the traffic slot 330 through contention with other D2D link. In case of occupying the traffic slot 330, the transmitting D2D user equipment and the receiving D2D user equipment can transceive data with each other using the occupied traffic slot 330.

A process for the transmitting D2D user equipment and the receiving D2D user equipment to occupy the traffic slot 330 shall be described in detail with reference to FIG. 5 as follows.

Figure 5:
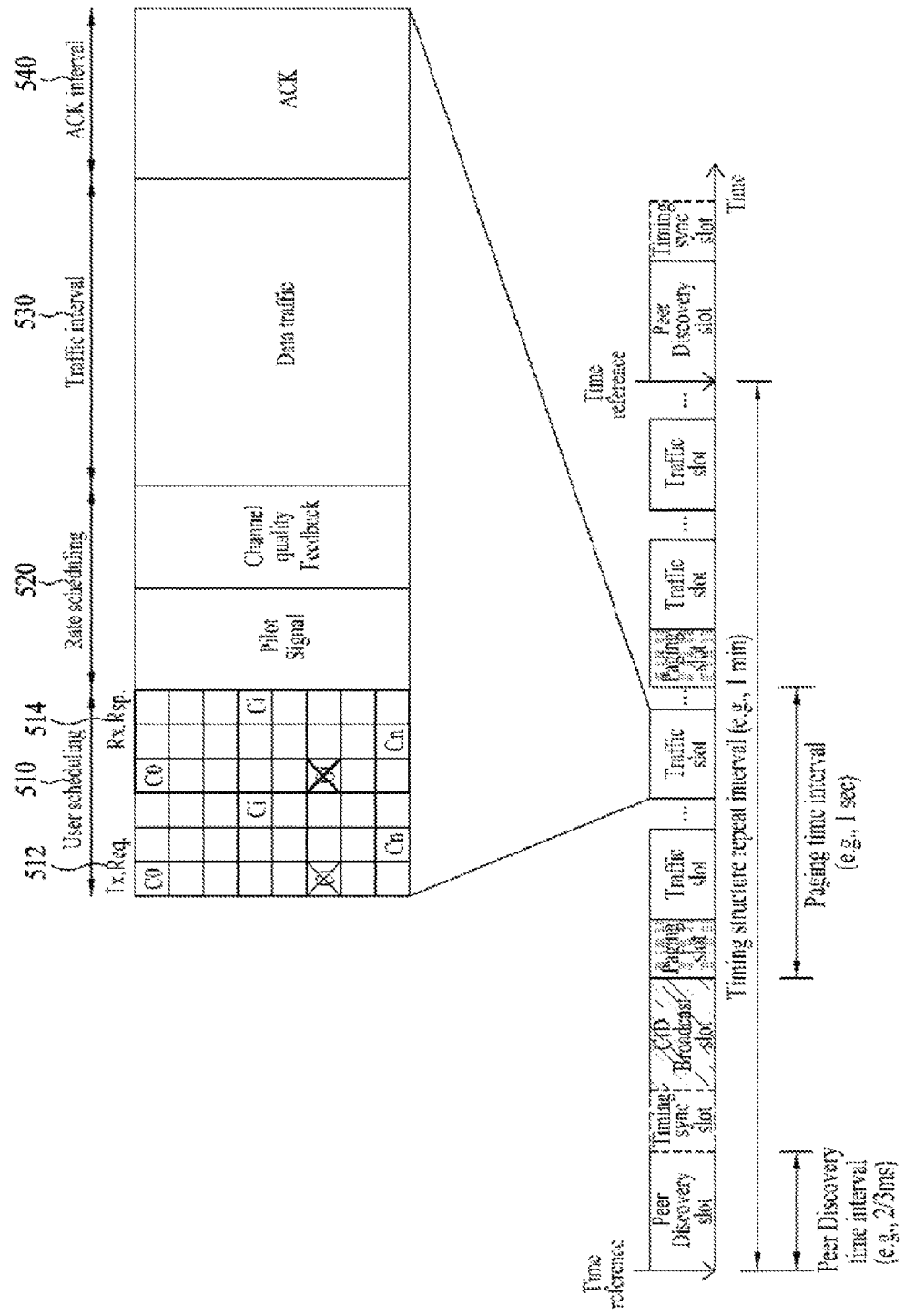
FIG. 5 is a diagram for one example to describe a process for a transmitting D2D user equipment and a receiving D2D user equipment to occupy a traffic slot.

FIG. 5 is a diagram for one example to describe a process for a transmitting D2D user equipment and a receiving D2D user equipment to occupy a traffic slot.

Referring to FIG. 5, the traffic slot 330 can include a user scheduling interval 510, a rate scheduling interval 520, a traffic interval 530 and an ACK interval 540.

The user scheduling interval 510 is provided to transceive a signal for the transmitting D2D user equipment and the receiving D2D user equipment to occupy the corresponding traffic slot 330. And, the user scheduling interval may include a transmission request interval (Tx Req) 512 and a reception response interval (Rx Res) 514. First of all, in the transmission request interval 512, the transmitting D2D user equipment is able to transmit a request signal to the receiving D2D user equipment through a resource corresponding to a selected CID using the CID selected through the paging slot 320.

The receiving D2D user equipment, which shares the same CID with the transmitting D2D user equipment, receives the request signal. If the receiving D2D user equipment determines that a data transmission is possible by a preset contention rule, the receiving D2D user equipment is able to transmit a response signal to the transmitting D2D user equipment through a resource corresponding to the CID in the response interval 514.

The receiving D2D user equipment having received the request signal successfully and the transmitting D2D user equipment having received the response signal successfully can determine that the corresponding traffic slot 330 is occupied. In case of determining that the traffic slot 330 is occupied, the transmitting D2D user equipment can transmit a pilot signal (or a reference signal) to the receiving D2D user equipment in the rate scheduling interval 520. Having received the pilot signal from the transmitting D2D user equipment, the receiving D2D user equipment can obtain a channel state for the pilot signal. In particular, the receiving D2D user equipment obtains a channel state (e.g., CQI (channel quality information), CSI (channel state information), SNR (signal to interference plus noise to ratio), etc.) and is then able to feed back the obtained channel state to the transmitting D2D user equipment having transmitted the pilot signal.

Having received the channel state from the receiving D2D user equipment, the transmitting D2D user equipment can determine whether to transmit data to the receiving D2D user equipment using a D2D traffic resource in the traffic interval 530. For instance, if a measured CQI or SNR is smaller or lower than a preset threshold, the transmitting D2D user equipment does not transmit the data in the traffic interval but is able to attempt an occupation of a next traffic slot 330.

If the transmitting D2D user equipment transmits the data using the traffic resource in the traffic interval 530, the receiving D2D user equipment is able to transmit ACK or NACK depending on a presence or non-presence of a successful data reception in the response interval 540.

A D2D user equipment to start a D2D communication may belong to one of the two types as follows.

1. D2D initiation user equipment (D2D initiator)—User equipment discovering a nearby D2D user equipment and making a request for a connection (i.e., transmitting a paging) to start a D2D communication 2. D2D user equipment candidates—D2D user equipment announcing its presence periodically and monitoring a paging as a user equipment candidate capable of performing a D2D communication As mentioned in the foregoing description, a D2D user equipment announces or advertises its presence to neighbor user equipments through a specific logical channel of a peer discovery slot defined in each peer discovery period. A D2D user equipment candidate announces its presence by broadcasting its beacon signal or the like in each peer discovery period. And, a D2D initiation user equipment (D2D initiator) searches and saves information of all neighbor user equipments transmitted in each peer discovery interval for a connection to a peer user equipment corresponding to a specific application. Yet, if a beacon signal is transmitted in each peer discovery slot and all neighbor user equipments are searched, it may cause a problem of causing considerable power consumption to a user equipment.

Moreover, a D2D communication is usable for various purposes (e.g., social network-chatting or game . . . , information of neighborhood stores, etc.). And, a specific service desires a connection to a specific user equipment capable of providing the corresponding service. In particular, if a specific D2D application starts, a D2D initiation user equipment (D2D initiator) starting a D2D communication may configure a D2D connection to a specific user equipment for a communication with a peer user equipment capable of data transmission/reception of a corresponding service flow. Yet, according to the related technologies defined so far, after informations of all neighbor nodes have been searched/collected, a user equipment fit for its purpose is selected and a connection is then configured. If the number of neighbor user equipment increases, it causes a problem that a power consumption of a user equipment for searching adjacent nodes increases as well.

To solve the above-mentioned problem, the present invention newly proposes a method of searching neighbor user equipments in accordance with a D2D service type as a method of minimizing a power consumption of a user equipment, which is capable of performing a communication between user equipments in a broadband wireless communication system (e.g., D2D or P2P system) supportive of a direct communication between D2D user equipments, in searching neighbor D2D user equipments.

Method of Setting Discovery Period in Accordance with Application (or Service) Type In accordance with an application (or service) type of a D2D user equipment, a discovery interval or a discovery period for announcing a presence of the D2D user equipment is set different. This minimizes a discovery signal periodically transmitted by the D2D user equipment and enables a D2D initiation user equipment to selectively search for a user equipment appropriate for a purpose of the D2D initiation user equipment, thereby minimizing a power consumption of the D2D user equipment.

D2D application (or service flow) types can be defined as follows (type 0~type n−1).

D2D service type 0—Social networking (e.g., friend registered on a list)

D2D service type 1—Information advertisement (e.g., neighborhood store, hospital, . . . )

D2D service type 2—Find people that share common interests

D2D service type 3—Game

A configuration of a peer discover slot in a dedicated channel can indicate an interval (period) information in accordance with a D2D service or application type. According to one embodiment, a D2D discovery offset, interval and cycle can be set to different values per D2D service type or D2D application type.

D2D discovery cycle=N*D2D discovery Period (N can be set to a value differing per D2D service type or D2D application type)

D2D discovery period=Discovery slot+Synchronization slot+{L*(CID broadcast slot+Paging slot+(M*Traffic slot)} (i.e., all intervals/slots assigned to a D2D dedicated channel)

A D2D service type and a D2D discovery interval configuration information in accordance with a type are preferably assumed as transmitted to D2D user equipments in advance by a base station of a cell that provides a D2D communication. And, they can be broadcasted, unicasted or multi-casted through a specific control message defined to carry a D2D related content (e.g., a dedicated channel information).

According to the configuration of the present invention, at least one D2D service offset/interval is set for a single user equipment. And, the single user equipment may be able to transmit its presence in multiple discovery slots.

Figure 6:
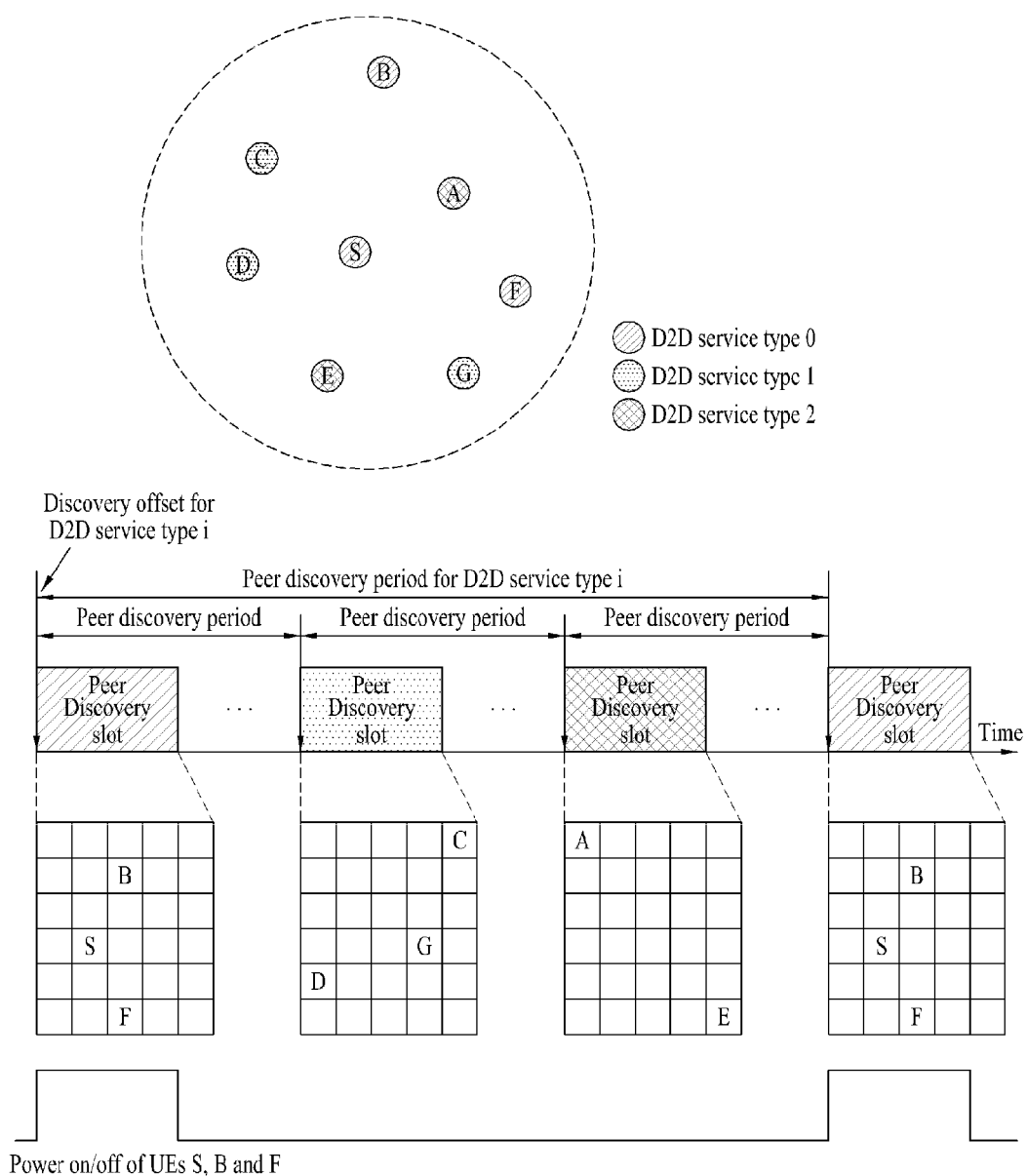
FIG. 6 is a diagram for one example to describe a method of configuring a D2D discovery interval in accordance with a D2D service type or a D2D application type.

FIG. 6 is a diagram for one example to describe a method of configuring a D2D discovery interval in accordance with a D2D service type or a D2D application type.

Referring to FIG. 6, assume that user equipments A to G are located around a user equipment S currently preparing for a D2D communication. When the user equipments B and F are user equipments corresponding to D2D service type 0, the user equipments C, D and G are user equipments corresponding to D2D service type 1, and the user equipments A and E are user equipments corresponding to D2D service type 2, assume that the user equipment S activates an application corresponding to the D2D service type 0 and searches for a node configured to provide the same application service to its surroundings for a direct communication with a counterpart node.

In this case, instead of searching all peer discovery slots and collecting informations of all neighboring nodes, the user equipment S collects informations on the node candidates B and E capable of providing the corresponding service only by searching the discovery slots 610 and 640 corresponding to the service type 0 only and is then able to select an optimal peer user equipment from them.

Method of Mapping Connection ID and Peer ID

Figure 7:
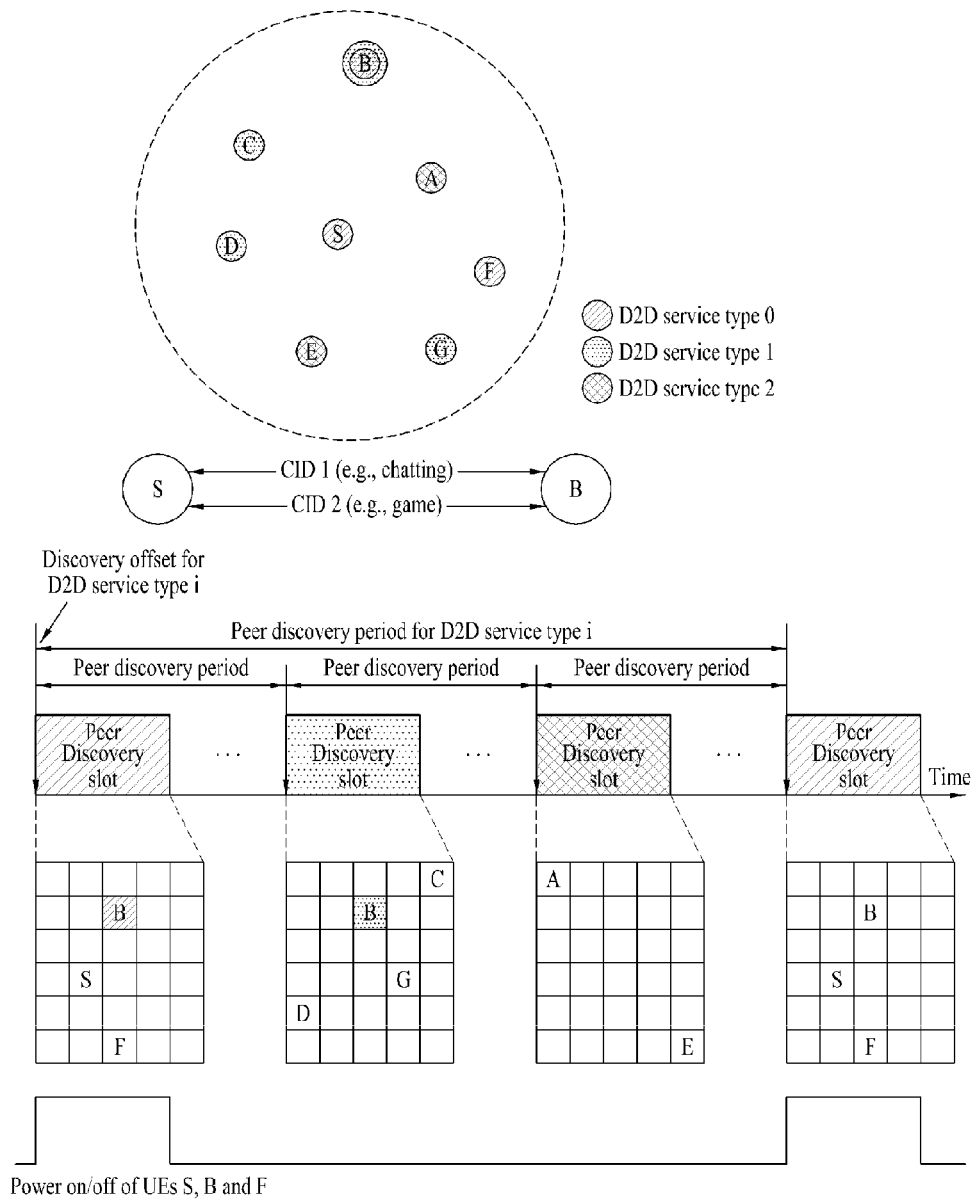
FIG. 7 is a diagram for one example to describe a method of configuring a D2D discovery interval in accordance with a D2D service type or a D2D application type.

FIG. 7 is a diagram for one example to describe a method of configuring a D2D discovery interval in accordance with a D2D service type or a D2D application type.

In case of a D2D communication, referring to FIG. 7, a single user equipment may be able to support at least one application or at least one connection can be configured in a manner of connecting at least one different application between two user equipments. Alternatively, at least one different connection may be configured for a single application.

In case that a peer ID (e.g., S, A, B, C, ... ) used in a peer discovery slot is a UE-specific ID, different connections established between user equipments in accordance with different applications need to be identified from each other with different IDs. To this end, a user equipment should know a mapping information on a connection to a corresponding user equipment. In particular, since a user equipment ID transmitted in each peer discovery slot may be transmitted in at least one slot in accordance with a corresponding application or a same peer ID may have a different connection ID, each of the user equipments S and B needs a service flow mapping information on a different connection ID between the user equipments S and B.

According to one embodiment, the user equipment S finds the user equipment B by searching for a peer discovery slot for D2D service type 0 to perform a chat with the user equipment B and establishes a connection (using a connection ID 1). The user equipment S finds the user equipment B by searching for a peer discovery slot for D2D service type 1 to play a game with the user equipment B and establishes a different connection. In this case, the user equipment S should use a different connection ID (e.g., a connection ID 2) to discriminate from the connection ID 1.

Method of Establishing Multiple Connections to User Equipment Having Connection Established Once As mentioned in the above description, the user equipment S searches for a peer discovery interval for an application type 0 to establish a connection to the user equipment B for the application (or service) type 0. In order to activate an additional application type 1 with the user equipment B, the user equipment S searches for a peer discovery interval corresponding to an application type 1 again and then establishes a connection. Yet, if a user equipment attempts to make a request for a connection additionally to establish another connection to a connection-established-once user equipment, the user equipment may skip a step of searching for a peer discovery interval (peer discovery period) and is then able to directly perform a step of setting a new connection ID with the corresponding user equipment by skipping a user equipment searching step. When multiple connections are established, a user equipment can transceive information on new connection establishment only through an upper message (e.g., MAC (media access control), RRC (radio resource control), PDCP (packet data convergence protocol), RLC (radio link control), etc.) instead of skipping the user equipment searching step.

Alternatively, a connection-established-once user equipment exchanges a service information, which can be provided by a corresponding user equipment, through an upper message in advance (e.g., capability negotiation) and is then able to establish additional connection(s) using the information exchanged in advance. In particular, in case that a connection to a specific user equipment is initially established, a procedure supposed to be performed be different from another procedure that should be performed in establishing an additional connection after the establishment of the initial connection. This can be checked through a peer user equipment information saved when the initial connection was established.

Case of Establishment of Connection to Peer User Equipment for the First Time

After synchronization, capability negotiation and security association (i.e., information (i.e., dynamic service flow addition) of a corresponding data flow after performing informations supposed to be exchanged between user equipments) have been exchanged, it may be preferable to perform a data communication actually.

Case of Presence of Established Connection to Peer User Equipment

In this case, since user equipment information is already obtained, information on a data flow (i.e., connection) to be newly configured is exchanged only, a new connection ID is mapped, and an additional data communication is then preferably performed through the corresponding connection.

In a physical procedure step, after a peer discovery interval has been skipped, it is possible to perform a data transceiving of a new connection in a traffic interval through such a connection establishing step as CID broadcast/paging.

Another Embodiment of Peer Discovery Interval Configuration Per Service Type

Figure 8A:
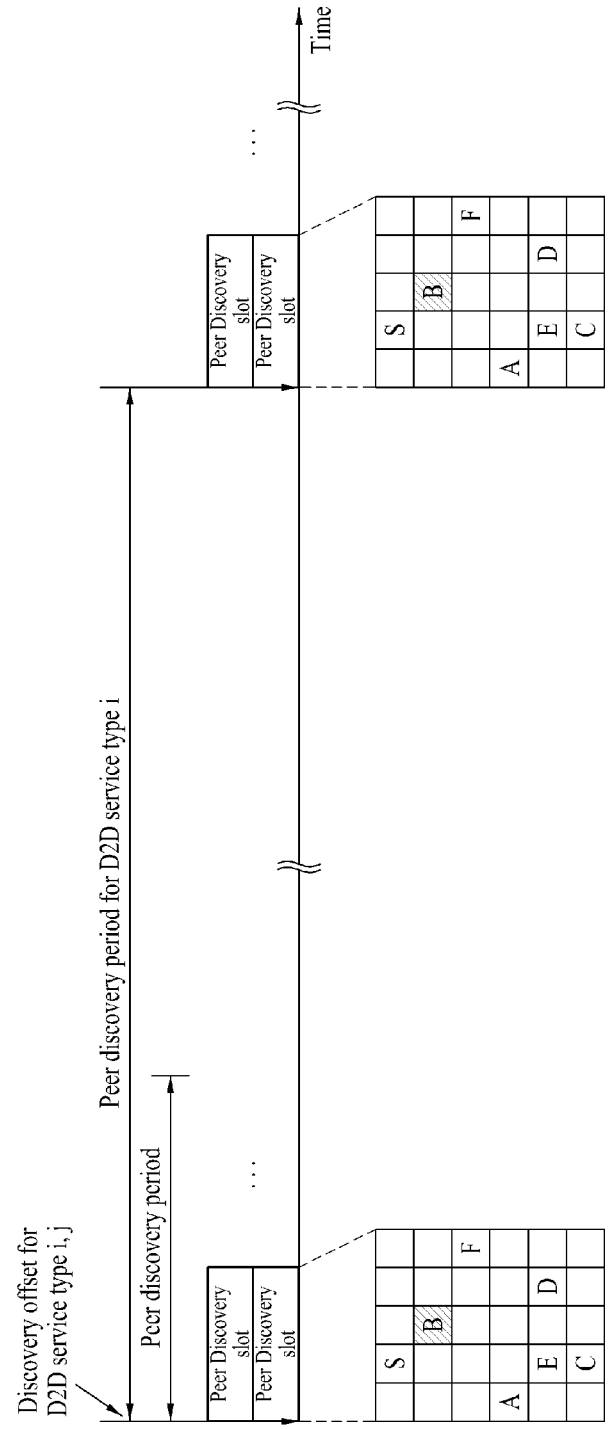
FIG. 8a and FIG. 8b are diagrams for examples to describe a method of configuring a D2D discovery interval in accordance with a D2D service type or a D2D application type.
Figure 8B:
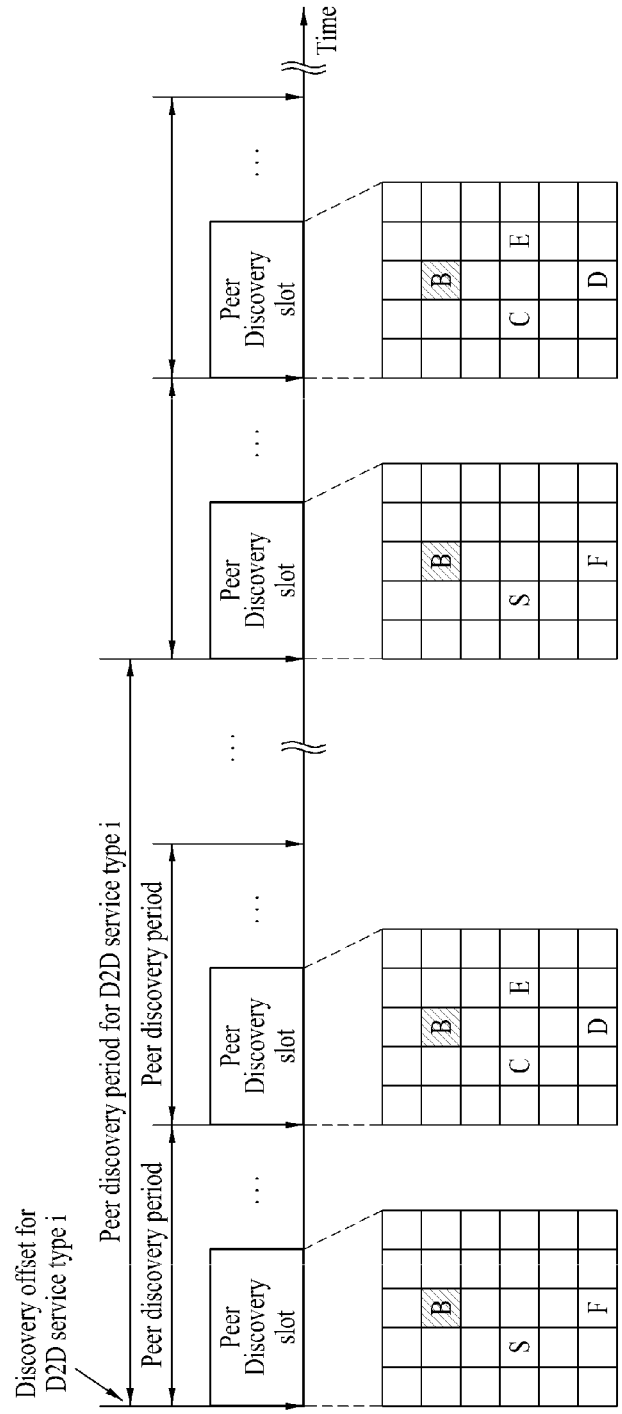

FIG. 8a and FIG. 8b are diagrams for examples to describe a method of configuring a D2D discovery interval in accordance with a D2D service type or a D2D application type.

According to another embodiment of the present invention, a per-service peer discovery interval can be configured in a following manner. First of all, a D2D discovery interval can have different D2D discovery offset, interval and cycle in accordance with a D2D application/service type. Moreover, referring to FIG. 8a, a Different D2D application/service types may have the same D2D discovery interval. A region of a single peer discovery slot is divided into at least two parts. And, the at least two parts can be assigned per application or used in a mixed manner.

Referring to FIG. 8b, it is able to assign at least two contiguous D2D discovery intervals. Hence, a user equipment should monitor the assigned at least two D2D discovery intervals.

As mentioned in the foregoing description, D2D application (service flow) type is defined for example. It is able to define a D2D service type in various ways. If a single user equipment activates several applications and is able to provide services of different types simultaneously, a lowest service type having several D2D discovery offsets/intervals can be defined to be included in a subset of a next service type. The concept in accordance with such a new D2D application or service type is illustrated in FIG. 9.

Figure 9:
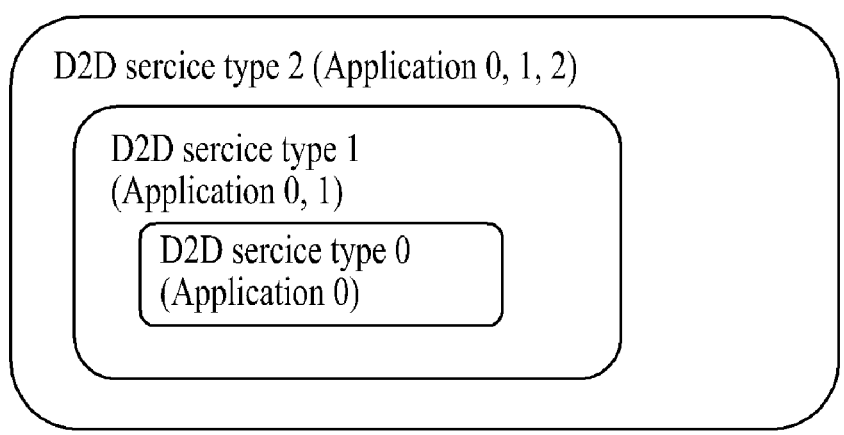
FIG. 9 is a diagram for new definition of a concept of a D2D application or service type.

FIG. 9 is a diagram for new definition of a concept of a D2D application or service type.

Referring to FIG. 9, assume that D2D application type 0 is defined as an application type for an information advertisement (e.g., a neighboring store, a hospital information, etc.). Assume that D2D application type 1 is defined as an application type for dinging people having D2D common interests. Assume that D2D application type 2 is defined as an application type for social networking (e.g., friends registered on a list). And, assume that D2D application type n−1 is defined as a game application type.

D2D service type i can be assigned in case of a user supportive of D2D application types 0 to (i−1) all. A D2D initiation user equipment awakes in a discovery slot corresponding to a service type appropriate for its service type and then searches/collects broadcasted informations of neighbor nodes.

As mentioned in the foregoing description, according to embodiments of the present invention, a discovery procedure performed for a D2D communication is performed to be appropriate for a D2D service type or a D2D application type, whereby power consumptions of D2D user equipments can be considerably reduced. In case of a D2D initiation user equipment making a request for a D2D communication connection establishment, it is able to minimize a user equipment power consumed for searching neighbor D2D user equipments. The D2D initiation user equipment is also able to selectively search and collect a user equipment required for an application activated by the D2D user equipment only. And, the D2D initiator user equipment is able to save information of the corresponding user equipment. In case of a D2D user equipment candidate waiting for a request for a connection of a D2D communication, it is able to minimize a power consumption in a manner of decreasing a discovery slot for indicating a presence of the D2D user equipment candidate.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method for a D2D user equipment to perform a communication in a wireless communication system supportive of D2D (device-to-device) communication is industrially applicable to various kinds of communication systems including 3GPP LTE, 3GPP LTE-A, IEEE 802 and the like.

What is claimed is:

1. A method of performing a communication by a first device-to-device (D2D) user equipment (UE) in a wireless communication system supportive of a D2D communication, the method comprising:

receiving a D2D discovery interval configuration information corresponding to a D2D service type or a D2D application type each from a base station;

finding neighbor D2D UEs which are sharing a first ID with the first D2D UE in a D2D discovery interval corresponding to a first D2D service type or a first D2D application type to enable based on the D2D discovery interval configuration information using the first ID, wherein the first ID is corresponding to the first D2D service type or the first D2D application type;

establishing a first connection with a second D2D UE using the first ID by selecting the second D2D UE from the found at least one or more neighbor D2D UEs;

performing a D2D communication corresponding to the first D2D service type or the first D2D application type with the second D2D UE in accordance with the first connection;

checking whether the second D2D UE is sharing a second ID with the first D2D UE; and establishing a second connection corresponding to a second D2D service type or a second D2D application type with the second D2D UE using the second ID without finding another D2D UE while maintaining the first connection, if the second D2D UE is sharing the second ID with the first D2D UE, wherein the second ID is corresponding to the second D2D service type or the second D2D application type.

2. The method of claim 1, wherein a period or length of the D2D discovery interval is different per the D2D service type or the D2D application type.

3. The method of claim 1, wherein the D2D discovery interval includes a discovery region corresponding to a plurality of D2D service types or a plurality of D2D application type and wherein a D2D discovery region corresponding to the first D2D service type or the first D2D application type in the D2D discovery interval is searched.

4. The method of claim 1, wherein the D2D discovery interval corresponding to the first D2D service type or the first D2D application type is located across at least two D2D discovery intervals.

5. The method of claim 1, further comprising transmitting a D2D discovery signal in the D2D discovery interval corresponding to the D2D service type or the D2D application type supported by the D2D user equipment.

6. A first device-to-device (D2D) user equipment (UE) of performing a communication in a wireless communication system supportive of a D2D (device-to-device) communication, the first D2D UE comprising:

a receiver configured to receive a D2D discovery interval configuration information corresponding to a D2D service type or a D2D application type each from a base station;

a processor configured to find neighbor D2D UEs which are sharing a first ID in a D2D discovery interval corresponding to a first D2D service type or a first D2D application type to enable based on the D2D discovery interval configuration information using the first ID, wherein the first ID is corresponding to the first D2D service type or the first D2D application type, the processor configured to establish a first connection with a second D2 UE using the first ID by selecting the second D2D UE from the found at least one or more neighbor D2D UEs, the processor configured to perform a D2D communication corresponding to the first D2D service type or the first D2D application type to be performed with the second D2D UE in accordance with the first connection, the processor configured to check whether the second D2D UE is sharing a second ID with the first D2D UE, the processor configured to establish a second connection corresponding to a second D2D service type or a second D2D application type with the second D2D UE using second ID without finding another D2D UE while maintaining the first connection,
wherein the second ID is corresponding to the second D2D service type or the second D2D application type.

* * * * *